United States Patent
Brown et al.

(10) Patent No.: US 6,581,449 B1
(45) Date of Patent: Jun. 24, 2003

(54) LOW PRESSURE WARNING SYSTEM FOR PNEUMATIC TIRES WITH RF TAGS AND MONITORS FOR EACH TIRE

(75) Inventors: Robert Walter Brown, Medina, OH (US); William Frank Dunn, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/049,754

(22) PCT Filed: Sep. 15, 1999

(86) PCT No.: PCT/US99/21198
§ 371 (c)(1),
(2), (4) Date: Feb. 11, 2002

(87) PCT Pub. No.: WO01/19626
PCT Pub. Date: Mar. 22, 2001

(51) Int. Cl.[7] .................... E01C 23/00; G01M 17/02
(52) U.S. Cl. .................. 73/146; 73/146.5; 73/146.3; 340/447
(58) Field of Search .................... 73/146, 146.5, 73/146.3; 340/572.1, 447, 448, 444, 442

(56) References Cited

U.S. PATENT DOCUMENTS

| | | | |
|---|---|---|---|
| 3,553,060 A | 1/1971 | Waltz | |
| 3,694,803 A | 9/1972 | Strenglein | |
| 3,810,090 A | 5/1974 | Davis, Jr. et al. | |
| 4,067,235 A | 1/1978 | Markland et al. | |
| 4,220,907 A | 9/1980 | Pappas et al. | |
| 4,319,220 A | 3/1982 | Pappas et al. | |
| 4,334,215 A | 6/1982 | Frazier et al. | |
| 5,297,424 A | 3/1994 | Sackett | |
| 5,335,540 A | 8/1994 | Bowler et al. | |
| 5,368,082 A | 11/1994 | Oare et al. | |
| 5,541,574 A | 7/1996 | Lowe et al. | |
| 5,661,651 A | * 8/1997 | Geschke et al. | ............... 701/88 |
| 5,731,754 A | 3/1998 | Lee, Jr. et al. | |
| 5,774,047 A | 6/1998 | Hensel, IV | |
| 5,790,016 A | 8/1998 | Konchin | |
| 5,880,363 A | 3/1999 | Meyer et al. | |
| 6,369,712 B2 | * 4/2002 | Letkomiller et al. | ..... 340/572.1 |
| 6,441,728 B1 | * 8/2002 | Dixit et al. | ................. 340/447 |

FOREIGN PATENT DOCUMENTS

| | | |
|---|---|---|
| EP | 0832765 | 4/1998 |
| WO | WO00/34061 | 6/2000 |
| WO | WO01/12453 | 2/2001 |
| WO | WO01/17806 | 3/2001 |

* cited by examiner

*Primary Examiner*—Edward Lefkowitz
*Assistant Examiner*—Alandra Ellington
(74) *Attorney, Agent, or Firm*—Howard M. Cohn

(57) ABSTRACT

Method and apparatus (200) for monitoring vehicle tire pressure and warning the driver when a low tire inflation pressure condition occurs includes transponder tags (220a . . . 220d, 300, 300a) and associated sensors (e.g., pressure, temperature) for each tire and a monitor (230a . . . 230d, 400) disposed in close proximity to each tire (204a . . . 204d). In this case manner, a low-powered radio transmission can take place between each tire tag and an associated one of the monitors. Each monitor is connected to a vehicle data bus 206, 430) for communicating, preferably bi-directionally, with a computer (208), and a central display (212) provides visual (or audible) warnings to the operator of the vehicle. The system is simple in operation, economical to manufacture, easy to install, and highly reliable, and conforms to standards established for heavy vehicles, and can be used on passenger car applications as well.

20 Claims, 5 Drawing Sheets

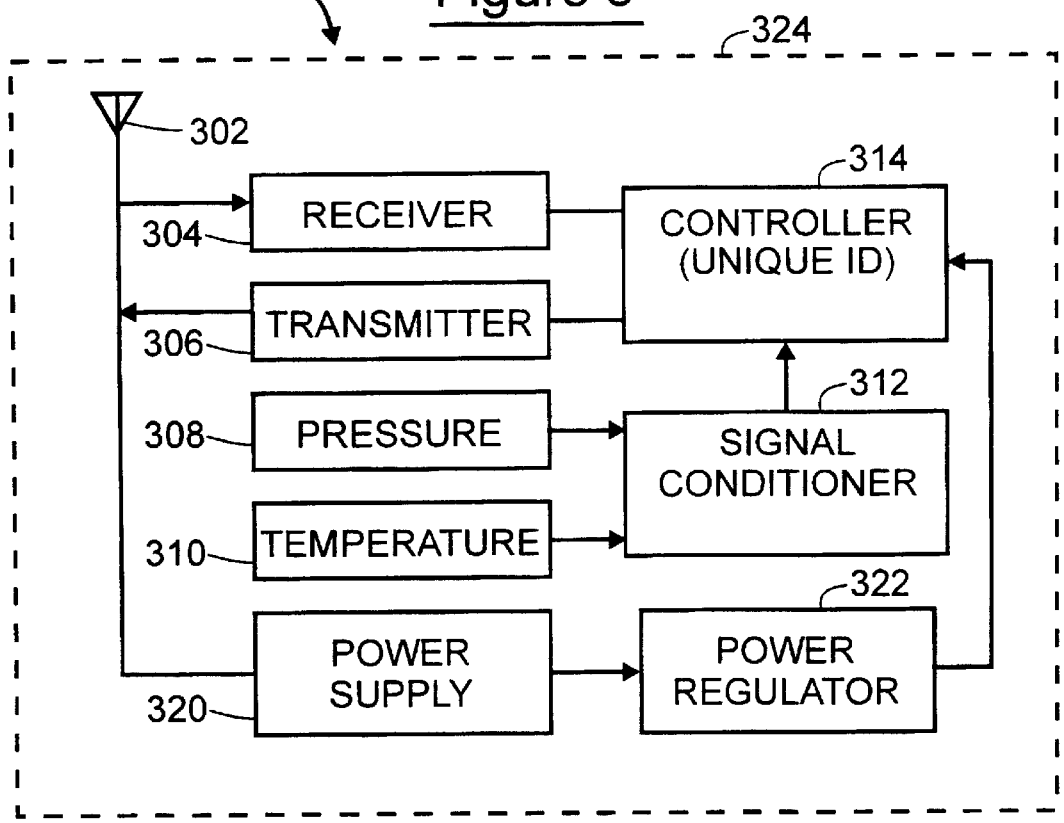

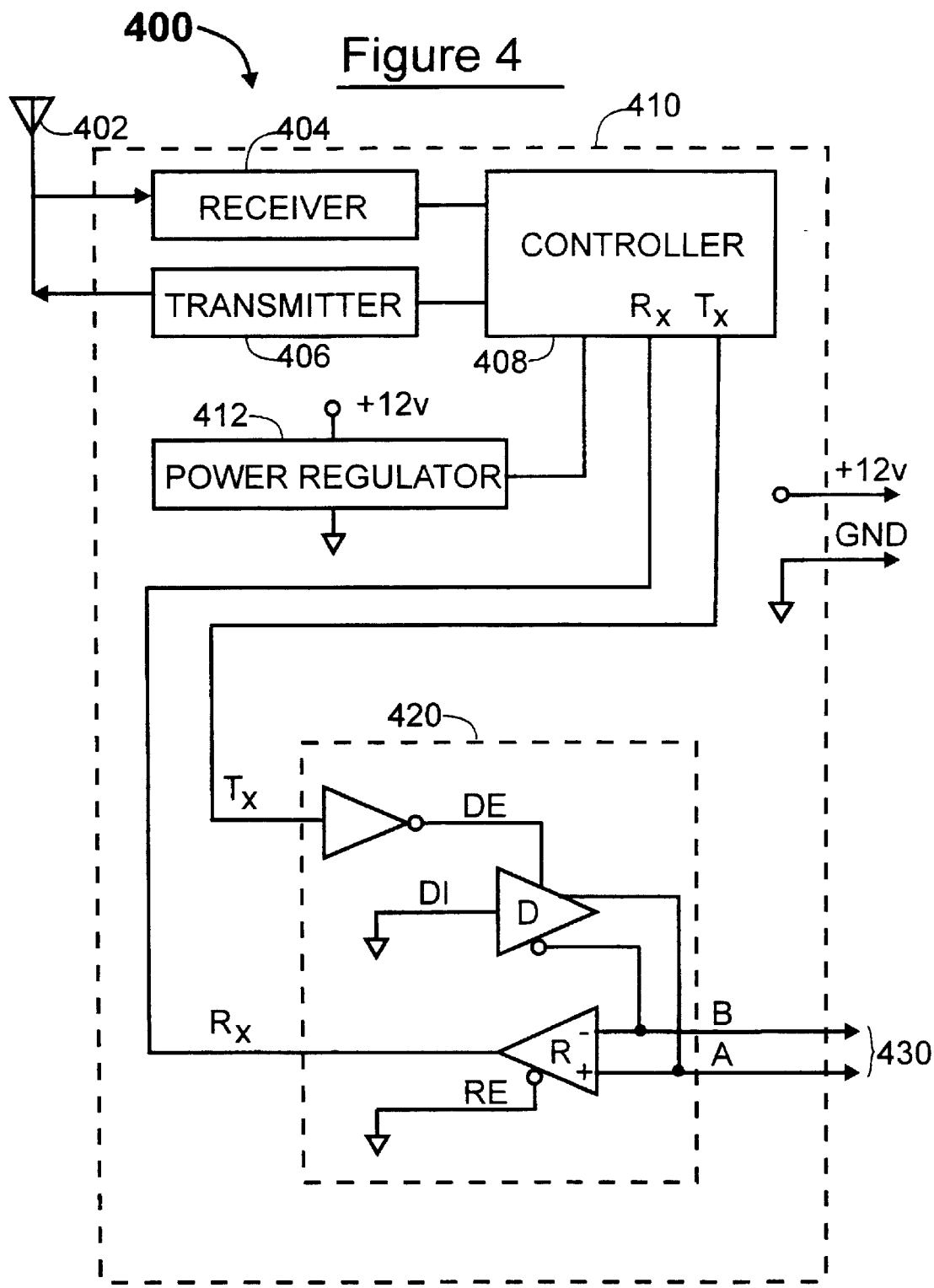

LOW PRESSURE WARNING SYSTEM FOR PNEUMATIC TIRES WITH RF TAGS AND MONITORS FOR EACH TIRE

CROSS-REFERENCE TO RELATED APPLICATIONS

This application relates to commonly-owned, PCT Patent Application No. PCT/US99/18610 filed Aug. 16, 1999.

TECHNICAL FIELD OF THE INVENTION

The invention relates generally to systems for measuring air pressure in pneumatic tires of vehicles and, more particularly, to systems including a sensor and a transponder associated with each of the vehicle tires.

BACKGROUND OF THE INVENTION

Safe, efficient and economical operation of a motor vehicle depends, to a significant degree, on maintaining the correct air pressure in the tires of the motor vehicle. Failure to correct promptly for faulty/abnormal (typically low) air.pressure may result in excessive tire wear, blow-outs, poor gasoline mileage and steering difficulties.

The need to monitor tire pressure is highlighted in the context of "run-flat" (driven deflated) tires, tires which are capable of being used in a completely deflated condition. Such run-flat tires, as disclosed for example in commonly-owned U.S. Pat. No. 5,368,082, incorporated in its entirety by reference herein, may incorporate reinforced sidewalls and mechanisms for securing the tire bead to the rim to enable a driver to maintain control over the vehicle after a catastrophic pressure loss, and are evolving to the point where it is becoming less and less noticeable to the driver that the tire has become deflated. The broad purpose behind using run-flat tires is to enable a driver of a vehicle to continue driving on a deflated pneumatic tire for a limited distance (e.g., 50 miles, or 80 kilometers) prior to getting the tire repaired, rather than stopping on the side of the road to repair the deflated tire. Hence, it is generally desirable to provide a low pressure warning system (LPWS) within the vehicle to alert (e.g., via a light on the dashboard, or a buzzer) the driver to the loss of air in a pneumatic tire.

FIG. 1 illustrates a typical low pressure warning system (LPWS) 100 of the prior art installed on a motor vehicle 102 (shown in dashed lines) having four pneumatic tires 104a . . . 104d installed on four respective wheels (not shown). A transponder ("TAG") 106a . . . 106d is associated with each of the tires 104a . . . 104d, respectively.

As used herein, a "transponder" is an electronic apparatus (device) capable of both receiving and transmitting radio frequency signals, and impressing variable information (data) in a suitable format upon the transmitted signal indicative of a measured condition (e.g., tire pressure) or conditions (e.g., tire pressure, temperature, revolutions), as well as optionally impressing fixed information (e.g., tire ID) on the transmitted signal, as well as optionally responding to information which may be present on a signal which is received by the transponder.

"Passive" transponders are transponders powered by the energy of a signal received from an external "interrogator" apparatus. "Active" transponders are transponders having their own power supply (e.g., a battery), and include active transponders which remain in a "sleep" mode, using minimal power, until "woken up" by a signal from an interrogator.

The transponders 106a . . . 106d are suitably passive transponders which obtain their operating power from an RF signal which is provided by an on-board interrogator 108 which is mounted within the vehicle.

The interrogator 108 comprises an RF transmitter 112 (e.g., for powering passive transponders), an RF receiver 114, control logic 116 which may include a microprocessor ($\mu$P), and a display device 118 such a visual display and optionally including an audible alarm. Antennas ("ANT") 110a . . . 110d are disposed on the vehicle 102, preferably adjacent the tires 104a . . . 104d, respectively, such as in the wheel wells of the vehicle. The antennas 110a . . . 110d are suitably ferrite loopstick antennas.

The use of multiple vehicle antennas 110a . . . 110d, each at a fixed position on the vehicle adjacent a respective tire 104a . . . 104d, such as in the wheel well, is well known, and is disclosed in U.S. Pat. Nos. 3,553,060; 3,810,090; 4,220,907; 4,319,220; and 5,774,047, all of which are incorporated in their entirety by reference herein. In this manner, close coupling can be effected between the tire transponders and the vehicle antennas, thereby facilitating identifying which of the several wheels on a vehicle has a sensed low pressure condition.

In use, the interrogator 108 powers the transponders 106a . . . 106d which, in turn, transmit data indicative of a measured condition (e.g., tire air pressure) back to the interrogator 108. In any such system, it is desirable to have efficient and effective coupling of signals between the fixed antennas 110a . . . 110d (alternatively, one centrally-located fixed antenna) and the moving (i.e., when the vehicle is in motion) transponders (each of which has its own antenna, not shown).

Low pressure warning systems for tires are generally well known, and representative examples may be found in the following U.S. Patents, all of which are incorporated in their entirety by reference herein: U.S. Pat. No. 3,694,803 (Strenglein; 1972); U.S. Pat. No. 4,067,235 (Markland, et al.; 1978); U.S. Pat. No. 4,334,215 (Frazier, et al.; 1982); and U.S. Pat. No. 5,335,540 (Bowler, et al.; 1994).

An important feature of a viable low pressure warning system employing transponders and an interrogator is providing effective coupling of radio frequency (RF) signals between the transponders which may be located inside of the pneumatic tires, and the interrogator which may be located at some central location in the vehicle. An additional important feature of a viable low pressure warning system is providing an indication to the operator of the vehicle of the condition being monitored, for example, low tire pressure, correct tire pressure, etc.

For example, a straightforward approach is to have an RF transmitter and pressure sensor within each tire (e.g., affixed to the valve stem thereof). In order to save power, the transmitter may only transmit when pressure drops below a threshold value. A single, centrally-located receiver in the vehicle cab can detect the transmission, and cause an audible signal to be sounded to alert the driver to the sensed low pressure condition. In such a system, the RF transmissions from the transmitters must be adequate to penetrate vehicle components to be detected by the receiver. Generally, no hard wiring from the vicinity of the wheels to the receiver is required when utilizing such an RF communications link. When relying on robust RF coupling between the individual transmitters (or transponders) and a central receiver (or interrogator), techniques should be provided to prevent "false alarms", such as a low tire pressure signal emitted by a transmitter of another vehicle in close proximity to the vehicle in question. Additionally, it is sometimes desirable to be able to ascertain which of the several (e.g., four) tires on a given vehicle has a sensed low pressure condition.

U.S. Pat. No. 3,533,060 (Garcia; 1970), incorporated in its entirety by reference herein, describes a pressure-responsive radio transmitter (13) disposed on each valve stem (21) of each tire (12) of a vehicle (11).

"Receiving antennas 16 are mounted in each of the wheel wells and connected by appropriate leads to a receiver set 17 mounted on or attached to the dashboard of the vehicle 11 . . . the receiver set can be of standard construction and include amplifying means to amplify the signals picked up by the antennas 16 and means for indicating the occurrence of such transmission, in the form of a buzzer, a bell, a light, or the like." (column 2, lines 30–38)

U.S. Pat. No. 4,220,907 (Pappas, et al.; 1980), incorporated in its entirety by reference herein, discloses a low tire pressure alarm system for vehicles such as trucks and cars. Each wheel is provided with a transmitter (200). A common receiver (300) has either a single receiving antenna, or multiple antennas, with each wheel having a separate antenna (302a . . . 302d) associated therewith. As disclosed therein at (column 14, line 66 through column 15, line 3):

"If multiple antennas are provided, they would be optimally loops of fairly large size, located near each wheel . . . however . . . a ferrite loopstick will do, and that smaller dimension of this arrangement makes for a more convenient mounting package"

The possibility of two antennas at each wheel location is also discussed in this patent (column 15, lines 11–15). As shown in FIG. 15, four antennas 302a . . . 302d may be selected, one at a time, by an analog switch (304).

U.S. Pat. No. 5,541,574 (Lowe, et al., 1996), incorporated in its entirety by reference herein, discloses (at FIG. 11 thereof):

"the electrical circuitry for a single exciter/reader [interrogator] 92 is provided at a suitable location within the vehicle, and used to communicate with transponders (not shown) on each of the vehicle's wheel assemblies 2a–2d. The output of the exciter/reader 92 is time shared between corresponding antenna coils 48a–48d adjacent each of the wheel sites. Only the antenna coils 48a–48d, and no electronics, are required at the localized wheel sites. This is facilitated by the extreme simplicity of the required signal protocol, and the large magnitude of the return signals. The exciter/reader 92 communicates with one tire transponder at a time, deactivating a given transponder before moving on to the next. " (column 7, lines 51–64)

U.S. Pat. No. 5,731,754 (Lee Jr., et al.; 1998), incorporated in its entirety by reference herein, discloses an apparatus 10, comprising a transponder 18 and sensors, suitable for mounting within or on a vehicle tire and which operates to sense and transmit various tire condition parameters to a remote interrogation unit 80. As disclosed therein:

"A transponder and sensor apparatus with on-board power supply is mounted in or on a vehicle tire. A pressure sensor, a temperature sensor and a tire rotation sensor are mounted in a housing along with the transponder, the power supply and an antenna. Upon receiving an interrogation signal from a remote interrogator, the transponder activates the sensors to sense tire pressure and temperature and then backscatter-modulates the radio frequency signal from the interrogator with the tire condition parameter data from the sensors to return the backscatter modulated signal to the interrogator." (Abstract)

The interrogator 80, as shown in FIG. 9 of U.S. Pat. No. 5,731,754, generates an interrogation signal which is transmitted by transmitter 84 over an antenna 85. The interrogation signal is received by the remotely located transponders 18, which respond using a backscatter modulation technique. The backscatter-modulated signal from the transponder 18 is passed by the antenna 85 to an input of a receiver 86, for decoding. In this manner, "the tire condition parameter data from one or more apparatus 10 may then be output from the interrogator 80 to an external host computer 90 by suitable communication circuits including parallel, RS-232, RS-485 and ETHERNET communication circuits." (column 7, lines 55–59).

U.S. Pat. No. 5,790,016 (Konchin, et al.; 1998), incorporated in its entirety by reference herein, discloses a tire pressure sensing system. A sensor-transducer (14) is mounted within each tire, and is essentially a passive LC circuit with a pressure-sensitive switching element. A receiver (20) is mounted in proximity to each tire, and comprises inductors and an amplifier which together form an oscillator. The system continuously monitors air pressure within each of the tires during motion of the motor vehicle though generation of an electromagnetic coupling between corresponding pairs of sensor-transducers and receivers during an alignment that occurs between the transducers and couplers during each rotation of the tire. An indicator interface (80) is located within the passenger compartment of the motor vehicle, such as on the dashboard, and displays the current status of each of the vehicle tires, such as with LEDs, to the motor vehicle operator. Each receiver is connected to the indicator interface through wiring, or, alternatively, through a wireless communication link.

BRIEF DESCRIPTION (SUMMARY) OF THE INVENTION

It is an aspect of the present invention to provide method and apparatus for monitoring an operating characteristic of a pneumatic tire, as defined in one or more of the appended claims and, as such, having the capability of being implemented in a manner to accomplish one or more of the subsidiary objects.

According to the invention, a Low Pressure Warning System (LPWS) comprises a "tag" associated with, and preferably disposed within, each tire of a vehicle. At least one sensor is associated with each tag, such as a pressure sensor. The tag is capable, in the least, of transmitting an RF signal modulated with information regarding measured air pressure within the tire, and may also include temperature data (in which case, a temperature sensor would also be associated with each tag). The RF signals from the tire tags are low-power, short range signals and, for each tag, are received by an associated monitor located in close proximity to the respective tire tag, such as within the respective wheel well of the vehicle. The monitor receives and demodulates the RF signal from the associated tire tag, and impresses a data signal indicative of tire temperature (and, optionally, pressure) on a data bus within the vehicle. An on-board vehicle computer is also connected to the data bus, to receive and interpret the data. A display is also connected to the data bus, to display the interpreted data, under direction of the computer. Optionally, the tag is also capable of receiving information on an RF signal transmitted by the associated monitor. Such a signal is generated by the monitor in response to a data signal impressed on the data bus by the computer. There is thus provided a method for measuring and monitoring tire pressure, and providing this information to a driver of the vehicle, including warning the driver when a low tire pressure condition occurs.

An advantage of the LPWS of the present invention is that the same design can be used in all types of vehicles from passenger cars to heavy duty vehicles, including trailers. The LPWS can be offered as an option by the vehicle manufacturer since it connects easily to (two wire plug-in connection, or 4 wires. Include power connections) and multiplexes its data to existing RS-485 (or the like) vehicle data buses.

Another advantage of the LPWS of the present invention is that all tire pressure (and temperature) data can be displayed on the common vehicle display, thereby eliminating a requirement for a dedicated tire parameter display.

Another advantage of the LPWS of the present invention is that it features a "short haul" (close proximity) RF link (between the tire tag and the antenna of the associated LPWS monitor) rather than a "long haul" RF link. An advantage of "short haul" is a short unobstructed signal path with resulting low power requirements and higher reliability, as well as other benefits of near field transmission.

Another advantage of the LPWS of the present invention is that, when receiving data the LPWS monitor removes the data from the RF signal and impresses the data directly onto the data bus, thereby eliminating any need for RF energy to be routed over the vehicle wiring. Conversely, when transmitting, the LPWS monitor generates its own RF, again obviating any need for RF energy to be routed over the vehicle wiring.

Other objects, features and advantages of the invention will become apparent from the description that follows.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Elements of the figures are typically numbered as follows. The most significant digits (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in an other figure. In some cases, similar (including identical) elements may be referred to with similar numbers in a single drawing. For example, each of a plurality of elements 199 may be referred to individually as 199a, 199b, 199c, etc. Such relationships, if any, between similar elements in the same or different figures will become apparent throughout the specification, including, if applicable, in the claims and abstract.

Figure 1:
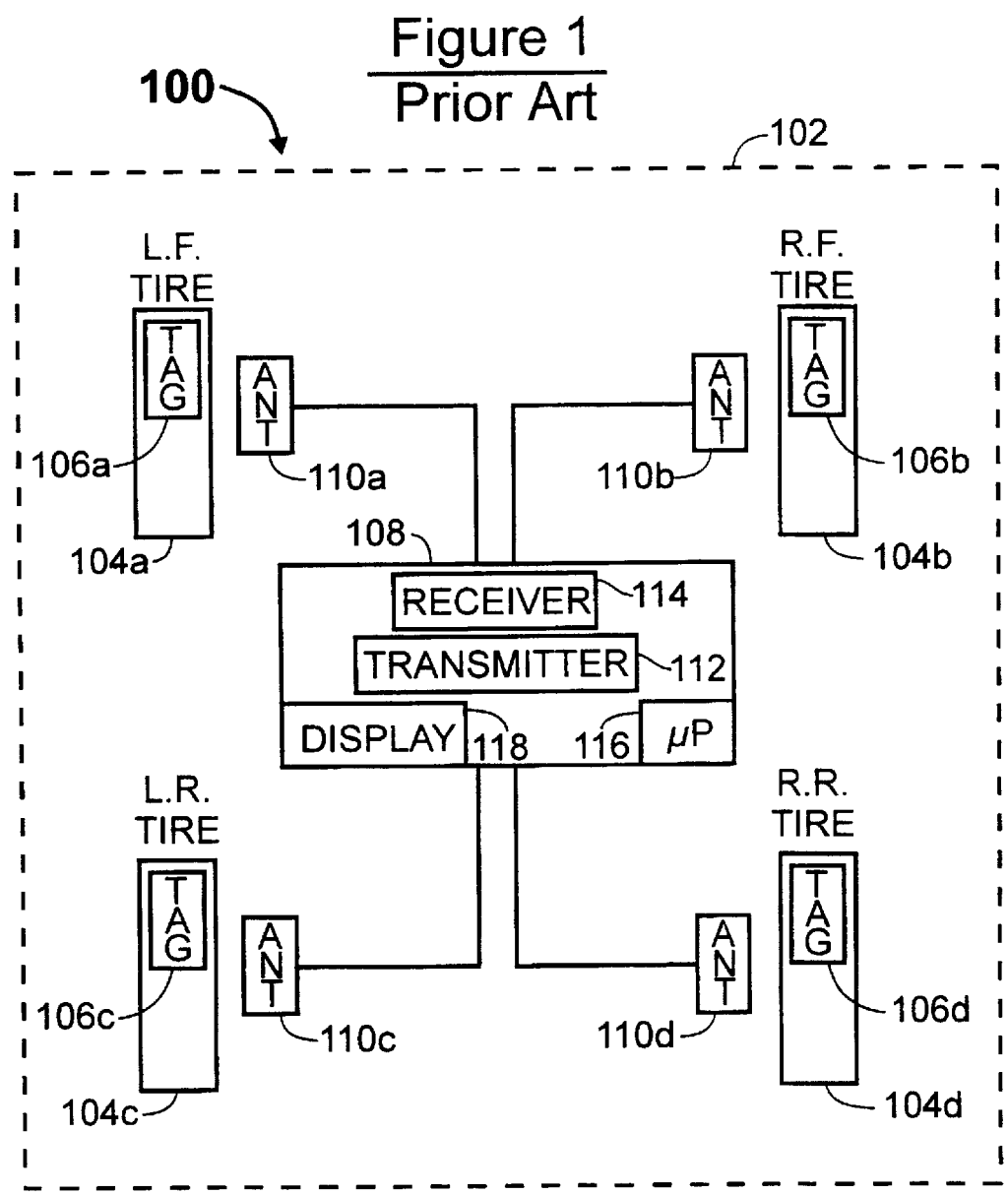
Figure 2:
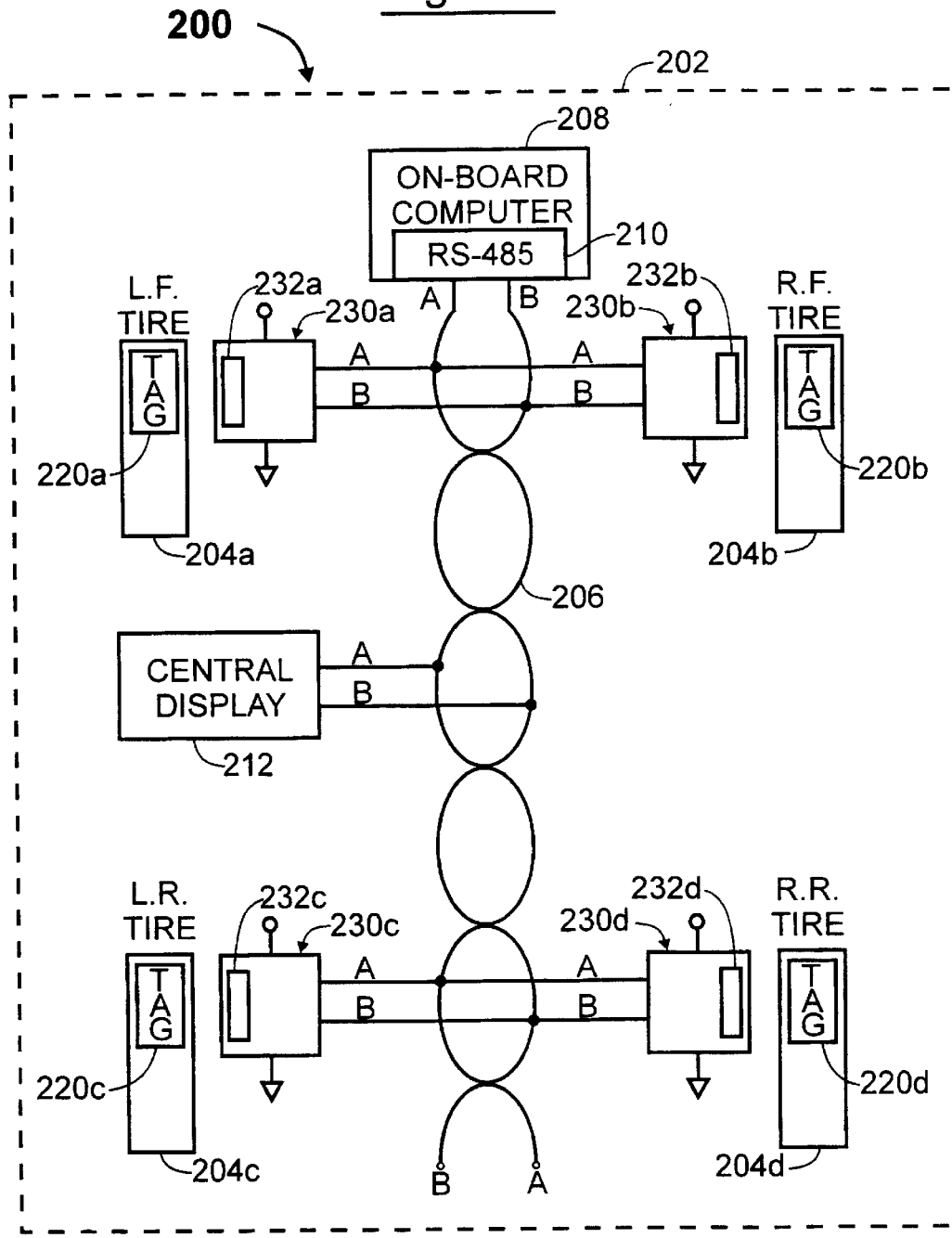
Figure 3A:
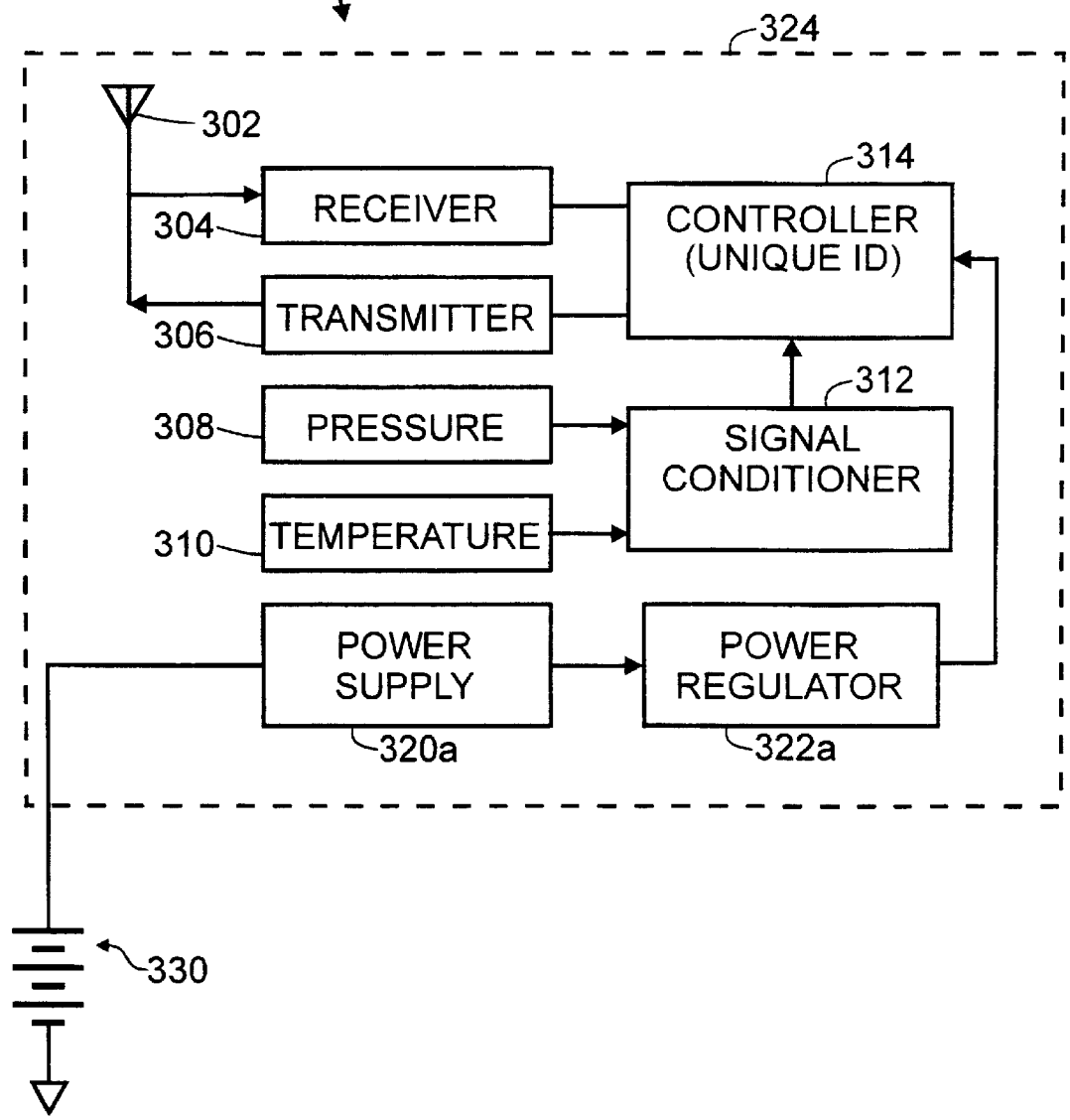

The structure, operation, and advantages of the present preferred embodiment of the invention will become further apparent upon consideration of the following description taken in conjunction with the accompanying drawings, wherein:

FIG. 1 is a simplified block diagram of a low pressure warning system (LPWS), according to the prior art;

FIG. 2 is a schematic illustration of a multiplexed low pressure warning system (LPWS) installed on a vehicle, according to the invention;

FIG. 3 is a schematic illustration of an exemplary wheel station reader for the LPWS system of FIG. 2, according to the invention;

FIG. 3A is a schematic illustration of an alternate embodiment of an exemplary wheel station reader for the LPWS system of FIG. 2, according to the invention; and FIG. 4 is a schematic illustration of an exemplary electronic "tag", located within each tire of the vehicle, for the LPWS system of FIG. 2, according to the invention.

DETAILED DESCRIPTION OF THE INVENTION

FIG. 2 illustrates an embodiment of the Low Pressure Warning System (LPWS) 200 of the present invention, installed on a vehicle 202 (shown in dashed lines), such as a typical passenger vehicle having four pneumatic tires 204a, 204b, 204c and 204d installed on four respective wheels (not shown).

The vehicle 202 is preferably equipped with an RS-485 (or equivalent) multiplexed serial data bus 206 controlled by an on-board vehicle computer 208 having an RS-485 interface 210. Preferably, a central display unit 212 is connected either directly to the computer 208 or is operatively connected (as shown) to the computer 208 via the data bus 206.

The serial data bus 206 is suitably an 18-gauge twisted pair of insulated wires (labeled "A" and "B"), preferably with a minimum of one twist per inch, with an overall length of less than 40 meters. It is within the scope of the invention that if no data bus is provided on the vehicle, one can be added thereto. For example, in the absence of an existing vehicle data bus, a dedicated data bus may be provided, such as a bi-directional data bus conforming to RS-485 or other suitable serial communications standards.

Each of the four tires 204a . . . 204d is equipped with an electronic module ("TAG") 220a . . . 220d, respectively, and associated sensor (not shown, well known) capable of monitoring one or more conditions such as air pressure and air temperature within the tire, and transmitting a radio frequency (RF) signal indicative of (e.g., modulated as a function of) the monitored condition(s) within the respective vehicle tire. The tags 220a . . . 220d are suitably transponders, but may alternatively simply comprise one or more condition sensors and a radio frequency transmitter. The tags 220a . . . 220d are described in greater detail with respect to FIGS. 3 and 3A, herein below.

The system 200 comprises four LPWS wheel station readers (monitors) 230a . . . 230d, each associated with a respective one of the tires 204a . . . 204d and located in close proximity therewith, such as mounted within the wheel wells of the vehicle. Each monitor 230a . . . 230d comprises an antenna 232a . . . 232d, respectively, which is attached at a fixed position on the vehicle adjacent the tire, within the near field of the respective tag (220). As mentioned herein above, the use of near field transmission has many distinct advantages over transmitting over an inherently greater distance from each wheel to a central location on the vehicle.

Each monitor (230) is connected to a source of power (as indicated by the lines terminating in circles and triangles) and is connected to the multiplexed serial data bus 206 for individually communicating with the on-board computer 208. The monitors 230a . . . 230d are described in greater detail with respect to FIG. 4, hereinbelow.

Each monitor 230a . . . 230d is generally comparable to an interrogator of a conventional transponder system, in that it comprises an antenna 232a . . . 232d, a receiver (not shown) for receiving transmissions for the tag, and a transmitter (not shown) for transmitting signals (and optionally power) to a respective one of the tags 220a ... 220d. Each antenna 232a ... 232d couples with an associated one of the tags 220a ... 220d, respectively.

It is within the scope of the invention that all components of the monitor (230), including the antenna (232) can be encapsulated in a single package. Alternatively, the antenna (232) can be deposed outside of each a package. The antenna 232 is suitably a coil of wire on a ferrite rod, such as is described in the aforementioned U.S. Pat. No. 4,220,907 and U.S. Pat. No. 4,319,220.

Each monitor 230a ... 230d comprises a suitable data transceivers (such as the DS36277 Dominant Mode Multipoint Transceiver by National Semiconductor), discussed in greater detail hereinbelow, to facilitate two-way data transmission via the data bus 206.

In this manner, monitored condition information carried by the RF signals from the respective tags (220) can be decoded (e.g., demodulated) and provided to the on-board computer 208 for subsequent display (212) to the operator of the vehicle. It is within the scope of the invention that suitable discernable visual and/or audible warnings can be used at the option of the vehicle manufacturer.

A monitor's transmissions to the respective tag may comprise a carrier signal for energizing a passive tag, and may comprise signals to "wake up" an active tag which is in a low-power sleep mode.

Monitored condition information carried by the RF signals from the respective tags 220a ... 220d can be decoded (e.g., demodulated) and provided to the on-board computer 208 for subsequent display (212) to the operator of the vehicle 202. It is within the scope of the invention that suitable discernable visual and/or audible warnings can be used at the option of the vehicle manufacturer.

Regarding communications occurring over the serial data bus 206, multiplex (MUX) wiring, or networking, is generally well known, and has been introduced in automotive applications to address the increase in complexity and the number of onboard electronic devices in automobiles.

For example, the Society of Automotive Engineers (SAE) has promulgated the J1708 "Recommended Practice" for implementing a bi-directional serial communications link, defining parameters of the serial link that relate primarily to hardware and basic software compatibility such as interface requirements, system protocol, and message format. J1708 is a hardware and basic communications protocol specification. The aforementioned DS36277 is a transceiver based on a standard RS-485 transceiver and optimized for use with J1708. The physical media of the J1708 serial data bus is 18-gauge twisted pair with a minimum of one twist per inch, with a maximum intended length of 40 meters. A follow-up to J1708 is the SAE J1587 Recommended Practice which defines a format for messages and data being communicated over the J1708 data bus. A number of message identification numbers (MIDs) are assigned to transmitter categories, and no two transmitters in the system shall have the same MID. Subsystem identification numbers (SIDs) are assigned, there being a plurality of SIDs definable for each MID. For example, there are a number of engine SIDs, a number of transmission SIDs, etc. A number of parameter identification characters (PID) are assigned.

For example, PID "241" is assigned to tire pressure, and PID "242" is assigned to tire temperature.

AN EXEMPLARY TIRE TAG

FIG. 3 is a simplified schematic illustration of an exemplary tag 300 (compare 220a ... 220d) for use in the system 200 of FIG. 2. The tag 300 is preferably a transponder, and comprises an antenna 302, a receiver 304, a transmitter 306, a pressure sensor 308, a temperature sensor 310, signal conditioning circuitry 312, and a microcontroller 314 which may preferably have a unique identification (ID) number associated therewith, the aforementioned electronic components being interconnected as shown in the figure.

The tag (transponder) 300 is an electronic device that requires power to operate, and may be either "active" or "passive". As mentioned hereinabove, "passive" transponders are transponders powered by the energy of a signal received from an external "interrogator" apparatus. "Active" transponders are transponders having their own power supply (e.g., a battery). FIG. 3 illustrates a passive version of the tag 300, wherein a power supply 320 rectifies an RF signal received on the antenna 302 and provides a raw DC signal to a power supply circuit 320 (typically comprising a bridge rectifier and a storage capacitor), which supplies DC current to an optional power regulator circuit 322 for powering the other components of the tag 300. The components of the tag 300 are suitably disposed within a package 324 to protect the components. The package 324 is suitably a plastic package within which the components are encapsulated. The antenna 302 is shown as being disposed within the package 324. However, it should be understood that the antenna 302 could be disposed outside of the package 324 including, for example, a loop of wire extending about the circumference of the tire on an inside surface thereof.

FIG. 3A illustrates an active version of the tag 300a (compare 300), wherein a battery 330 provides power to a power supply circuit 320a (compare 220) to a power regulator 322a (compare 322) to power the other components of the tag 300a. The battery 330 is suitably located outside (as shown) of the package 324.

AN EXEMPLARY LPWS MONITOR

As mentioned hereinabove, monitors (230a ... 230d) are attached to the vehicle and located adjacent to each tire (204a ... 204d) such that a low-powered radio transmission can take place between the tire and the respective monitor in a controlled manner. The LPWS monitor comprises a transmitter to address the tag within the tire, a receiver to receive pressure (and, optionally, temperature) data from the tag (220a ... 220d) within the tire, and a controller to supervise the sequencing of transmitter/receiver operation and to transmit data received from the tag over the vehicle data bus (106).

FIG. 4 is a simplified schematic illustration of an exemplary monitor 400 (compare 230) for use in the system 200 of FIG. 2 with a transponder-type tag such as was described with respect to FIGS. 3 and 3A.

The monitor 400 comprises an antenna 402 (compare 232), a receiver 404 for receiving transmissions from the tag (300), a transmitter 406 for transmitting to the tag (300), and a controller 408 for controlling the operation of the monitor 400. The transmissions to the tag may comprise a carrier signal for energizing a passive tag, and may comprise signals to "wake up" an active tag which is in a low-power sleep mode. These, and other components of the monitor 400 are suitably disposed within a package 410 to protect the components. The package 310 is suitably a plastic package within which the components are encapsulated. The antenna 402 is shown as being disposed outside of the package 410. However, it should be understood that the antenna could be disposed within the package 410.

The monitor 400 is preferably hard-wired, via a power regulator 412 which is preferably contained within the package 410, to the automobile power (vehicle power supply), typically positive 12 volts ("+12 V") and ground ("GND").

The monitor 400 also comprises a data transceiver 420 which is preferably contained within the package 410. The data transceiver 420 is operatively connected to the controller 408, as illustrated to facilitate two-way data transmission between the controller 408 and a vehicle data bus 430 (compare 206). The vehicle data bus 430 is suitably bi-directional and conforms to RS-485 communications standards.

As mentioned hereinabove, if no data bus is provided on the vehicle, one can be added thereto. For example, in the absence of an existing vehicle data bus (206), a dedicated data bus may be provided, such as a bi-directional data bus conforming to RS-485 or other suitable serial communications standards.

The data transceiver 420 is suitably a DS36277 Dorninant Mode Multipoint Transceiver, by National Semiconductor. The DS36277 Dominant Mode Multipoint Transceiver is designed for use on bi-directional differential busses. It is optimal for use on Interfaces that utilize Society of Automotive Engineers (SAE) J1708 Electrical Standard. The device is similar to standard TIA/EIA-485 transceivers, but differs in enabling scheme. The Driver's Input is normally externally tied LOW, thus providing only two states: Active (LOW), or Disabled (OFF). When the driver is active, the dominant mode is LOW, conversely, when the driver is disabled, the bus is pulled HIGH by external bias resistors. The receiver provides a FAILSAFE feature that guarantees a known output state when the Interface is in the following conditions: Floating Line, Idle Line (no active drivers), and Line Fault Conditions (open or short). The receiver output is HIGH for the following conditions: Open Inputs, Terminated Inputs (50 Ohm), or Shorted Inputs. FAILSAFE is a highly desirable feature when the transceivers are used with Asynchronous Controllers such as UARTs.

Although the invention has been illustrated and described in detail in the drawings and foregoing description, the same is to be considered as illustrative and not restrictive in character it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed:

1. In a vehicle having pneumatic tires, a system for monitoring tire pressure comprising an RF tag associated with each of the vehicle tires, each tag providing a signal indicative of respective tire pressure; the system characterized by:
    a monitor associated with each of the RF tags, each monitor being mounted in close proximity with each respective tire;
    one central computer; and
    a bi-directional serial data bus connected to the computer and to each of the monitors.
2. The system of claim 1, characterized in that:
    the RF tag is a transmitter.
3. The system of claim 1, characterized in that:
    the RF tag is a transponder.
4. The system of claim 3, characterized in that:
    the RF tag is a passive transponder.
5. The system of claim 3, characterized in that:
    the RF tag is an active transponder.
6. The system of claim 1, characterized in that each monitor comprises:
    a ferrite rod antenna for coupling with an associated one of the RF tags.
7. The system of claim 1, characterized in that:
    the data bus comprises a vehicle data bus, for use in multiple vehicle data communication tasks.
8. The system of claim 1, characterized by:
    a display connected to the data bus.
9. The system of claim 1, characterized in that:
    the data bus comprises a dedicated data bus, for exclusive use with the system for monitoring tire pressure.
10. The system of claim 1, characterized in that:
    the data bus conforms to RS-485.
11. The system of claim 1, characterized in that:
    the RF tag provides a signal indicative of respective tire temperature.
12. A method of monitoring vehicle tire pressure wherein the RF tag is associated with each of the vehicle tires, each tag providing a signal indicative of respective tire pressure; the method characterized by the steps of:
    mounting a monitor in close proximity to each tire such that each monitor communicates with the RF tag associated with the respective tire;
    using each monitor for converting between RF signals and data streams suitable for a bi-directional serial data bus;
    connecting the monitors and a single on board computer to the data bus; and
    using the computer for interpreting and displaying data form the RF tags.
13. The method of claim 12, characterized in that:
    the RF tag is a transmitter.
14. The method of claim 12, characterized in that:
    the RF tag is a transponder.
15. The method of claim 14, characterized in that:
    the RF tag is a passive transponder.
16. The method of claim 12, characterized by:
    comprising each monitor of a ferrite rod antenna for coupling with an associated one of the RF tags.
17. The method of claim 12, characterized by:
    conforming the data bus to RS-485.
18. The method of claim 12, characterized by:
    sharing the data bus as a vehicle data bus, for use in multiple vehicle data communication tasks.
19. The method of claim 12, characterized by:
    dedicating the data bus to exclusive use with the system for monitoring tire pressure.
20. The method of claim 12, characterized by:
    measuring tire temperature with the RF tag.

* * * * *